(12) United States Patent
Wissner et al.

(10) Patent No.: US 10,409,872 B2
(45) Date of Patent: *Sep. 10, 2019

(54) IDENTIFYING CONTENT ITEMS FROM VARIOUS SOURCES ASSOCIATED WITH AN OBJECT

(71) Applicant: Facebook, Inc., Menlo Park, CA (US)

(72) Inventors: James Matthew Wissner, Chelsea, MI (US); Robert James Morgan, San Rafael, CA (US); Satish Chander Bhatti, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1027 days.

This patent is subject to a terminal disclaimer.

(21) Appl. No.: 14/553,591

(22) Filed: Nov. 25, 2014

(65) Prior Publication Data

US 2016/0147890 A1    May 26, 2016

(51) Int. Cl.
*G06F 16/9535* (2019.01)
*G06F 16/28* (2019.01)
*G06F 16/2457* (2019.01)

(52) U.S. Cl.
CPC .... *G06F 16/9535* (2019.01); *G06F 16/24578* (2019.01); *G06F 16/284* (2019.01)

(58) Field of Classification Search
USPC .......................................................... 707/727
See application file for complete search history.

(56) References Cited

U.S. PATENT DOCUMENTS

| 2004/0114049 A1* | 6/2004 | Arora | H04N 7/0122 348/445 |
|---|---|---|---|
| 2011/0179020 A1* | 7/2011 | Ozzie | G06F 17/3089 707/723 |
| 2013/0346401 A1* | 12/2013 | Karidi | G06F 17/30867 707/723 |
| 2014/0040370 A1* | 2/2014 | Buhr | H04L 67/306 709/204 |

\* cited by examiner

*Primary Examiner* — Muluemebet Gurmu
(74) *Attorney, Agent, or Firm* — Fenwick & West LLP

(57) ABSTRACT

An online system receives content items from one or more content sources. The content items are mapped to objects in a database of the online system based on measures of affinity of the content items for the objects. When a query identifying an object in the database is received by the online system, the online system identifies content items associated with the identified object. Information describing the identified content items is generated by the online system and provided to a user or entity from which the query was received. Additionally, information describing social engagement with the identified object may be determined based on the content items mapped to the identified object and included in the information describing the identified content items.

14 Claims, 2 Drawing Sheets

IDENTIFYING CONTENT ITEMS FROM VARIOUS SOURCES ASSOCIATED WITH AN OBJECT

BACKGROUND

This disclosure generally relates to aggregating social activity, and more specifically relates to generating an aggregated representation of social activity related to a topic.

Numerous online platforms provide their users with the ability to create, find, and share content related to any number of topics. The rate and growth of content being published is increasing rapidly, especially in real-time social networking platforms. These online platforms provide a valuable source of information to broadcasters, which may use content created by online platform users to supplement their broadcasts. However, existing online platforms do not cohesively surface real-time data or apply substantive quality filters to created content. Thus, a broadcaster desiring to incorporate particular types of content into a broadcast is unable to easily identify the desired content for inclusion into the broadcast. Often, a broadcaster navigates through large amounts of content maintained by an online platform to identify content for inclusion in a broadcast. As the amount of content provided by online platforms increases, it becomes increasingly more difficult for broadcasters to identify high-quality information from content generated by online platform users for integration into a broadcast.

SUMMARY

An online system generates aggregated representations of social activity related to objects in a database. In one embodiment, the online system interfaces with partner systems, such as broadcast systems, to integrate social activity data into media distributed by the partner systems. The online system receives content items from a variety of content sources, and determines measures of affinity between various content items and objects in a database. The online system associates a content item with one or more objects based on the measures of affinity of the content item for various objects. For example, a content item is associated with an object for which the content item has a maximum measure of affinity or is associated with one or more objects for which the content item has at least a threshold measure of affinity. In various embodiments, the online system determines measures of affinity between a content item and various objects using match keys extracted from the content item, grammatical structure of the content item, or metadata of the content item (e.g., author, time created, and geographic location). In some embodiments, the online system associates a content item with one or more objects based on an ontology specifying relationships between the objects. An ontology may be associated with a topic and specify relationships between various objects associated with the topic. In one example, the online system maintains a database of objects associated with a sports ontology defining relationships between such objects as teams, athletes, and coaches.

The online system receives a query identifying an object in the database from a partner system or other entity. Based on the received query, the online system generates an aggregated representation of content items having at least a threshold measure of affinity to the object identified by the query. In one embodiment, the aggregated representation is a list of content items having at least a threshold measure of affinity to the object. In another embodiment, the online system generates an analysis of user engagement with the object based on content items having at least a threshold affinity to the object, and the aggregated representation provides information describing the analysis. If a user, such as an administrator of a partner system, selects items from the aggregated representation to integrate into media distributed by the partner system, the online system sends the selected items to the partner system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
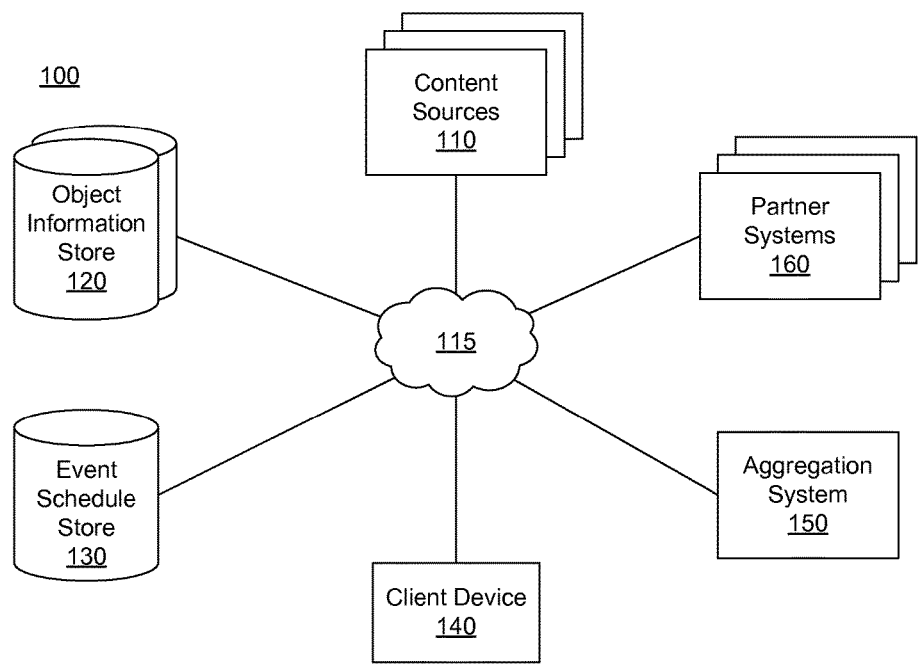
FIG. 1 is a block diagram of a system environment in which an aggregation system operates, according to one embodiment.

FIG. 1 is a high level block diagram of a system environment 100 for an aggregation system 150. The system environment 100 shown by FIG. 1 comprises one or more content sources 110, one or more object information stores 120, an event schedule store 130, one or more client devices 140, a network 115, the aggregation system 150, and one or more partner systems 160. In alternative configurations, different and/or additional components may be included in the system environment 100.

The content sources 110 provide feeds of content items and may include any of a variety of systems for managing content creation. For example, a content source 110 creates content or feeds of content in real-time or in near real-time. Examples of content sources 110 include social networking systems, news websites, rich site summary (RSS) feeds, and the like. Authors provide content items to a content source 110, which publishes the content items to various users of the content source 110. Various types of content items may be provided by a content source 110 to users. Example types of content items include social networking posts, check-ins to a location, news updates, blog entries, image data, audio data, and video data. Users of a content source 110 view and interact with content items published by the content source 110. Content items published via a content source 110 may be publically available to any user of the content source 110 or may be available to a subset of the users of the content source 110. For example, an author's content items published by a social networking system are visible to users connected to the author via the social networking system, but are not visible to users that are not connected to the author via the social networking system. Furthermore, content sources 110 may provide external systems with access to the content items by application programming interfaces (APIs) or any other suitable method. A content source 110 may also enable users to engage with content items posted by other users, such as indicating a preference for a content item (i.e., "liking" the content item), sharing a content item with additional users of the content source 110, or sharing a content item with a user of an additional content source 110.

An object information store 120 stores objects and information related to the objects. In various embodiments, the object information stores 120 are maintained by the content sources 110, by the aggregation system 150, or by one or more systems external to the content sources 110 and external to the aggregation system 150 that provide access to the object information stores 120 (e.g., provide access to the object information via an application programming interface). In one example, an object information store 120 stores sports-related objects, such as names of sports teams, athletes, coaches, and commentators. An object information store 120 may also store other information about stored objects. In the preceding example storing sports-related objects, the object information store 120 stores information about the teams, including athletes and coaches of each team, a city associated with each team, and a name of each team's home venue.

The event schedule store 130 stores one or more schedules of events associated with objects in one or more of the object information stores 120. In various embodiments, the event schedule store 130 includes dates and/or times of events associated with one or more objects maintained by one or more object information stores 120. For example, if an object information store 120 includes sports-related objects, the event schedule store 130 includes one or more schedules of sporting events involving the objects. In this case, schedules in the event schedule store 130 provide dates and times of athletic events, teams and/or athletes competing in each event, and the location of each event. The event schedule store 130 may be separate from the object information stores 120, or may be included in one or more of the object information stores 120.

The client devices 140 are one or more computing devices capable of receiving user input as well as transmitting and/or receiving data via the network 115. In one embodiment, a client device 140 is a conventional computer system, such as a desktop or a laptop computer. Alternatively, a client device 140 may be a device having computer functionality, such as a personal digital assistant (PDA), a mobile telephone, a smartphone or another suitable device. A client device 140 is configured to communicate via the network 115. In one embodiment, a client device 140 executes an application allowing a user of the client device 140 to interact with the content sources 110 or the aggregation system 150. For example, a client device 110 executes a browser application to enable interaction between the client device 140 and the aggregation system 150 via the network 115. In another embodiment, a client device 140 interacts with the aggregation system 150 through an application programming interface (API) running on a native operating system of the client device 140, such as IOS® or ANDROID™.

The aggregation system 150 receives content items from one or more content sources 110 and maps the received content items to objects in a structured object store. In one embodiment, the aggregation system 150 retrieves information from one or more object information stores 120 to populate an object store (e.g., a structured object store) with objects associated with one or more ontologies. An ontology maintained by the aggregation system 150 defines roles and relationships of entities in a given domain. Objects in the aggregation system 150 are particular instances of the entities in the ontology. For example, a sports ontology defines relationships between entities such as discipline, league, team, athlete, and coach. Example objects within the sports ontology include football (an instance of the discipline entity), the National Football League (an instance of the league entity), the San Francisco 49ers (an instance of the team entity), Colin Kaepernick (an instance of the athlete entity), and Jim Harbaugh (an instance of the coach entity). The aggregation system 150 associates Colin Kaepernick and Jim Harbaugh with the San Francisco 49ers based on the relationships between athletes, coaches, and teams defined by the sports ontology.

To map content items received from one or more content sources 110 to a structured object store, the aggregation system 150 determines measures of affinity between various content items and the objects. The mapping of content items into the structured object store allows the aggregation system 150 to access and analyze content items associated with particular objects. For example, the aggregation system 150 retrieves content items mapped to an object when a query identifying the object is received. The aggregation system 150 generates aggregated representations of the content items mapped to an identified object (e.g., an object identified by a query), such as a list of content items mapped to the object or an analysis of interactions with the object based on interactions with the content items mapped to the object, and optionally based on additional information associated with the object.

The partner systems 160 curate and distribute media content by any of a variety of distribution channels, including television, radio, the Internet, or local or custom networks. In one embodiment, a partner system 160 creates and distributes broadcasts of media content via television, radio, or other media. For example, a partner system 160 is a news organization providing a television news broadcast. In another embodiment, a partner system 160 manages online portals associated with one or more topics that aggregate content from a variety of different sources (including broadcasts from one or more partner systems 160 and content items from one or more content sources 110), allowing users to learn about or to follow particular topics. For example, a partner system 160 provides an online sports portal allowing users to view information about previous and upcoming sporting events, to learn more about particular athletes or teams, and to communicate with other fans. In yet another embodiment, a partner system 160 distributes content items in public places, such as at a sporting event, a concert, or other event. For example, a partner system 160 displays scores, photos, and commentary on an athletic venue's jumbotron during a sporting event. Content distributed by a partner system 160 may include custom content generated for the partner system 160. For example, if a partner system 160 provides a broadcast, content distributed by the partner system 160 includes video footage captured by the partner system 160 for the broadcast. Numerous other types of content may be distributed by the partner systems 160. Moreover, content distributed by a partner system 160 may be related to any of a variety of topics, including current events, sports, musicians and concerts, theater, and fashion shows.

The partner systems 160 communicate with the aggregation system 150 to integrate content items from one or more content sources 110 into media content distributed by the partner systems 160. Using an API or other suitable interface between a partner system 160 and the aggregation system 150, content items or engagement analytics related to objects of interest are retrieved from the aggregation system 150 and made available to the partner system 160 for incorporation into media. For example, the partner system 160 retrieves video footage of a news event captured by a bystander and uploaded to a content source 110 from the aggregation system 150 to incorporate the video footage into a broadcast. As another example, the partner system 160 retrieves photos captured by attendees at an event and uploaded to a content source 110 from the aggregation system 150 to display the photos on a jumbotron at the event. In yet another example, the partner system 160 retrieves data describing social engagement of users with objects from the aggregation system 150 to provide the social engagement data on a website.

The client device 140, content sources 110, and aggregation system 150 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 115 may be encrypted using any suitable technique or techniques.

Figure 2:
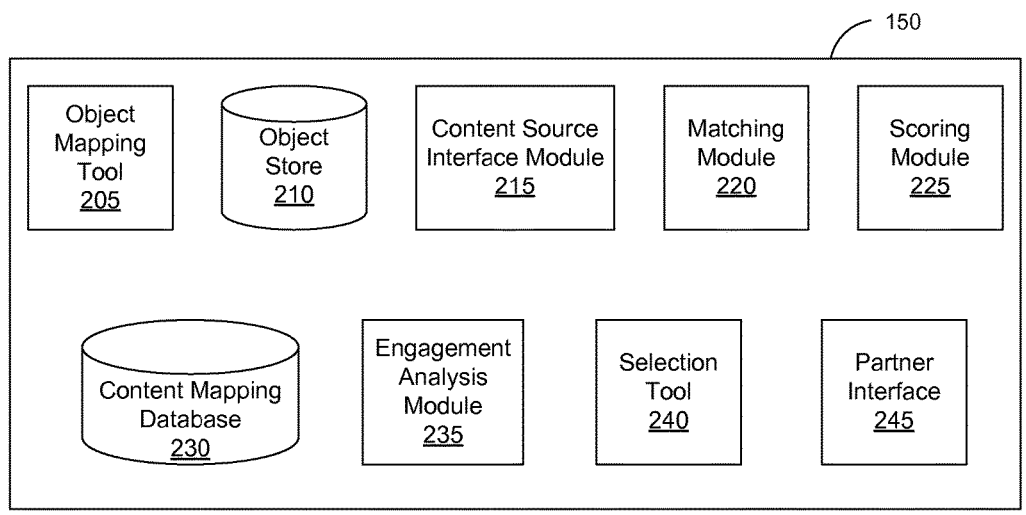
FIG. 2 is a block diagram of an aggregation system, according to one embodiment.

FIG. 2 is a block diagram of an architecture of the aggregation system 150. The aggregation system 150 shown in FIG. 2 includes an object mapping tool 205, an object store 210, a content source interface module 215, a matching module 220, a scoring module 225, a content mapping database 230, an engagement analysis module 235, a selection tool 240, and a partner interface 245. In other embodiments, the aggregation system 150 may include additional, fewer, or different components for various applications. Conventional components such as network interfaces, security functions, load balancers, failover servers, management and network operations consoles, and the like are not shown so as to not obscure the details of the system architecture.

The object mapping tool 205 retrieves information from one or more object information stores 120 and populates the object store 210 using the retrieved information. In one embodiment, the object mapping tool 205 maps information from one or more object information stores 120 to objects in the object store 210 according to an ontology. For example, to populate the object store 210 with objects associated with a sports ontology, the object mapping tool 205 retrieves lists of teams and team rosters from one or more object information stores 120 and creates a record for each object, where an object record includes information associated with an object (e.g., match keys for identifying the object, characteristics of content items associated with the object, types of content items associated with the object). The object records may be associated with other object records based on relationships or roles between objects specified by the ontology. For example, the object mapping tool 205 creates an association between an object record for an athlete and an object record for the athlete's team.

In one embodiment, the object mapping tool 205 maps other information retrieved from the object information stores 120 to records created for the objects. For example, the object mapping tool 205 adds identifying information about an athlete, including nicknames of the athlete and hashtags identifying the athlete, to the athlete's record in the object store 210. As another example, the object mapping tool 205 adds identifying information about a team, such as the team's nicknames, home stadium, and city affiliation, to the team's record in the object store 210. In some cases, the information added to an object's record by the object mapping tool 205 is stored as a positive or negative match key associated with the object. A positive match key is a term or phrase that can be used to identify an object. For example, positive match keys associated with an athletic team may include the name of the team, abbreviations of the name, nicknames, and the city affiliation of the team. A negative match key is a term or phrase that does not identify the object. Negative match keys associated with an athletic team may include names of teams or other objects that are similar to the team's name that should not be used to identify the team.

In one embodiment, each match key in an object record is associated with affinity for the object. The affinity of a match key for an object represents a likelihood of the object being associated with a content item including the match key. For example, the phrase "San Francisco Giants" has a high positive affinity to the San Francisco Giants team object, so it is highly likely that a content item including the phrase is referencing the team object. As another example, the phrase "New York Giants" has a high negative affinity to the San Francisco Giants team object, so it is highly unlikely that a content item using the phrase is referencing the team object.

In one embodiment, the object mapping tool 205 provides an interface to a human editor for modifying object records in the object store 210. Using the interface, a human editor may create or edit relationships between object records, augment object records with other information about the objects (such as athlete or team nicknames), add or remove match keys, define or modify affinities between objects, or complete other actions related to the object records.

The content source interface module 215 retrieves content items from various content sources 110. In some embodiments, feeds of multiple content items are retrieved from various content sources 110. For each content item, the content source interface module 215 retrieves textual content, image content, audio content, or video content, as well as metadata (e.g., author and time the content item was created). In some embodiments, the content source interface module 215 may also retrieve a location associated with various content items, such as a location where a content item was created (e.g., geotagging information or an internet protocol (IP) address of a client device 140 from which an author generated the content item). In one embodiment, the content source interface module 215 retrieves the content items by accessing a public API of the content sources 110.

The matching module 220 maps content items received from the content sources 110 to objects in the object store 210. For example, the matching module 220 matches content items to a particular object in the object store 210 (e.g., an object corresponding to an athlete) or to a set of objects in the object store 210 (e.g., an object corresponding to an athletic team and objects corresponding to athletes on the team). As another example, the matching module 220 matches content items to an event associated with one or more objects, such as a particular athletic event (e.g., a game between two teams). In the example of a game between two teams, the event is associated with two teams having objects in the object store 210 as well as athletes who are members of each team and associated with objects in the object stores 210 for a particular period of time associated with the event.

To map content items retrieved from the content sources 110 to objects, the matching module 220 determines an affinity of the content items to various objects or sets of objects in the object store 210. The matching module 220 determines a measure of affinity of a content item for multiple objects maintained by the object store 210 and maps the content item to an object based on the measures of affinity. For example, the content item is mapped to an object for which the content item has a maximum measure of affinity. Alternatively, the matching module 220 may map a content item to an object if the content item has at least a threshold measure of affinity for the object. The matching module 220 may determine a measure of affinity between a content item and each object stored in the object store 210 or between the content item and a subset of objects stored in the object store 210.

In one embodiment, the matching module 220 selects candidate objects from the object store 210 for comparison to a content item. When a content item is received from a content source 110, the matching module 220 tokenizes the text of the content item into a set of discrete terms or phrases. The matching module 220 then selects candidate objects from the object store 210 by comparing the tokens with content in object records included in the object store 210 and associated with various objects. For example, the matching module 220 selects objects associated with object records having content matching at least a threshold number of tokens extracted from the content item as candidate objects. The matching module 220 then determines measures of affinity between the content item and each of the candidate objects.

To determine a measure of affinity between a content item and an object, the matching module 220 determines an affinity of one or more match keys extracted from the content item for content associated with the object (e.g., content included in an object record associated with the object). For example, the matching module 220 determines a measure of affinity of a content item for an object by extracting match keys from the content item and determining measure of affinity of the various match keys for content included in an object record associated with the object and included in the object store 210. In this case, the matching module 220 extracts data (e.g., text data) from the content item, identifies match keys in the object store 210 having at least a threshold measure of similarity to the extracted data, identifies an object associated with each identified match key, and retrieves affinity values associated with match keys associated with identified objects. If the content item includes data having at least the threshold measure of similarity to a single match key, the matching module 220 may determine the measures of affinity between the content item and objects in the object store 210 as the affinity values between the match key and various objects. If content extracted from a content item has at least the threshold measure of similarity to multiple match keys associated with an object, the matching module 220 determines the measure of affinity between the content item and the object based on a function combining the affinity values of each match key associated with the object having at least a threshold measure of similarity to content extracted from the content item. For example, the matching module 220 determines a measure of affinity between a content item and an object as a weighted average of affinity values associated with various match keys associated with the object having at least a threshold measure of similarity to content extracted from the content item. The matching module 220 stores the measures of affinity determined between content items and objects in the content mapping database 230. In one embodiment, a content item is mapped to an object if the content item has at least a threshold measure of affinity for the object.

In one embodiment, the matching module 220 analyzes a grammatical structure of text in a content item to determine a measure of affinity between the content item and an object. Rather than analyzing individual terms included in the content items, the matching module 220 matches a content item to one or more objects in the object store 210 based on sentence structure of text data in the content item. For example, the matching module 220 compares text data in a content item to a set of grammatical templates, where each grammatical template includes variables for objects in the object store 210 having various types. Example grammatical templates include "<city> <team name>," "<athlete1> bailed out <athlete2>," and "<athlete1> just threw down <athlete2>," where each city, team name, and athlete variable may have a value of any object having a type specified by the variable. The grammatical templates may be associated with particular ontologies or particular entities within an ontology. For example, a grammatical template applicable to basketball may be different than a grammatical template applicable to football, so different grammatical templates are associated with ontologies for entities associated with football and with ontologies for entities associated with basketball. The grammatical templates may be learned over time by the aggregation system 150 based on analysis of content items received over time. In other embodiments, a user of the aggregation system 150 defines grammatical templates associated with particular objects or with a particular ontology.

The matching module 220 uses the grammatical templates to determine a measure of affinity between a content item and an object. For example, several content items include the match keys "Detroit" and "lions," some discussing the Detroit Lions football team and others discussing lions at a zoo in Detroit. The matching module 220 compares these content items to the grammatical templates, and determines that the content items discussing the Detroit Lions football team match a grammatical template having a "<city> <teamName>" structure while the content items describing lions at the Detroit zoo do not match the grammatical template. Accordingly, the content items discussing the Detroit Lions are determined to have higher measures of affinity for an object associated with football than the measures of affinity for the object associated with football by content items about lions at the zoo.

Additionally, the matching module 220 may also use metadata associated with a content item to determine measures of affinity between the content item and various objects in the object store 210. In one embodiment, the matching module 220 determines a measure of affinity of the author of a content item to each object in a set of objects in the object store 210. For example, if a content item's author frequently writes about a particular sports team, an affinity between the author and the sports team is high. In another embodiment, the matching module 220 determines an affinity of the content source 110 of the content item to each of a set of objects in the object store 210. For example, a news website affiliated with a particular city may be more likely to write about the city's athletic teams than a news website affiliated with a different city, so the city's news website may have a high affinity to the city's athletic teams. The affinity between an author or content source 110 and an object may be stored in the object store 210 in an object record associated with the object.

The matching module 220 uses the match keys, grammatical structure, and/or metadata associated with a content item (e.g., author or content source affiliation) to determine a baseline measure of affinity between a content item and various objects. In one embodiment, the matching module 220 increases or decreases the baseline measure of affinity based on other metadata of the content item. For example, if an object in the object store 210 is associated with an event, one embodiment of the matching module 220 accounts for a time when a content item was created relative to a time associated with the event to determine a measure of affinity between the content item and the object associated with the event. For example, the matching module 220 compares the time the content item was created to a schedule of events associated with one or more objects and increases the measure of affinity between the content item and an object associated with an event from the baseline measure of affinity if the content item was generated during a time window corresponding to the event (e.g., during the event, less than a threshold amount of time before the event, or less than a threshold amount of time after the event) or decreases the measure of affinity from the baseline measure of affinity if the content item was generated outside the time window corresponding to the event.

As another example, the matching module 220 modifies a measure of affinity between a content item and an object based on a location associated with the content item, such as a location where the content item was created. The matching module 220 compares the content item's location to locations associated with objects in the object store 210, such as locations associated with events associated with objects in the object store 210 or locations associated with objects themselves. For example, a content item is geotagged as created at an athletic stadium. In this example, a measure of affinity between the content item and objects associated with the athletic stadium (e.g., teams playing at the stadium or athletes on the teams playing at the athletic stadium) is likely to be higher than the measures of affinity between the content item and other objects. Accordingly, the matching module 220 increases the measure of affinity between the content item and objects associated with the stadium from a baseline measure of affinity.

The scoring module 225 generates a score for each content item representing a quality of each content item, a social impact with each content item, or representing any other suitable factor. In one embodiment, a score associated with a content item represents a measure of a uniqueness of the content item, a social contribution of the author of the content item, a measure of user responses to the content item received by one or more of the content sources 110, or any other suitable characteristic associated with the content item. The score may provide a likelihood of a user interacting with the content item or of the user having an interest in the content item. For example, the scoring module 225 analyzes content items retrieved from the content sources 110 to identify repeated content items or repeated formats of content items. In this example, content items having a similar format, such as check-ins by users to locations, are flagged as repeated if at least a threshold number of content items have the similar format, so the scoring module 225 decreases the score of content items having the similar format. Similarly, content items reposted by multiple users may receive lower scores than the originally-posted content item. As another example, if a content item was posted to a social networking system, the scoring module 225 retrieves an engagement score from the social networking system describing an amount of interaction by an author of the content item with the social networking system and accounts for the engagement score when generating a sore for the content item. For example, content items associated with authors with at least a threshold engagement score with the social networking system receive higher quality scores than content items associated with authors having less than the threshold engagement score with the social networking system. Furthermore, responses of users to a content item on a content source 110 may influence the content item's score. For example, the scoring module 225 assigns a higher score to a content item based on a number of "likes" of the content item by user users of a content source 110, based on a number of users sharing the content item with other users of the content source 110, or a number of times the content item is shared with other users of the content source 110. In one embodiment, the scoring module 225 stores the score associated with each content item in the content mapping database 230 in association with the measures of affinity between the content item and various objects.

The content mapping database 230 stores the measures of affinity between various content items and objects. For example, the content mapping database 230 stores a measure of affinity in association with an object identifier and a content item identifier to maintain information identifying the measure of affinity of a content item corresponding to the content item identifier for an object corresponding to the object identifier. In one embodiment, the content mapping database 230 stores measures of affinity between a content item and an object having at least a threshold value. Additionally, as described above, the content mapping database 230 may include additional information associated with a content item along with the measure of affinity between the content item and an object, such as a score associated with the content item.

The engagement analysis module 235 analyzes content items mapped to respective objects in the object store 210 to quantify social engagement with the objects. Based on the determined social engagement with an object, the engagement analysis module 235 may also identify trends in social engagement with the object. In one embodiment, the engagement analysis module 235 determines social engagement with an object based on one or more measures of engagement with the object. Example measures of engagement with an object include a number of content items mapped to the object or a number of unique users who created content items mapped to the object. The engagement analysis module 235 may also use measures of engagement with each content item mapped to an object to determine social engagement with the object. Example measures of engagement with a content item include an amount of positive feedback received for the content item (e.g., a number of likes, a number of upvotes, etc.), a number of times the content item was shared with users of the content sources 110, or an amount of time users of the content sources 110 dwell on the content item. Other factors may additionally or alternatively be used to determine engagement with content items and objects. In one embodiment, the engagement analysis module 235 uses a weighted combination of various engagement measures to generate a score representing overall social engagement with an object in the object store 210.

In some embodiments, the engagement analysis module 235 identifies trends in social engagement with objects by analyzing the measures of engagement according to one or more factors. For example, the engagement analysis module 235 identifies trends in social engagement with an object over time by analyzing engagement with content items mapped to the object across a range of times or within specified time periods. As another example, the engagement analysis module 235 identifies trends in social engagement with an object by users in different geographic locations by determining locations of users engaging with the content items mapped to object. Engagement may be analyzed according to any of a variety of other factors, such as demographic characteristics of users interacting with content items mapped to an object, the content source 110 used for interaction with content items mapped to the object, or properties of devices used by users to interact with the content sources 110 from which content items mapped to the object are received.

Furthermore, one embodiment of the engagement analysis module 235 compares user engagement with two or more objects using the measures of social engagement associated with each of the objects. For example, the engagement analysis module 235 compares user engagement with two objects within a specified period of time (e.g., the previous day) and determines which of the two objects had a higher level of social engagement in the specified time period. As another example, the engagement analysis module 235 compares social engagement of users in a particular demographic group with each of a set of objects. The engagement analysis module 235 may compare user engagement with objects according to any of a variety of other factors.

The selection tool 240 provides an interface for a user (e.g., an administrator of a partner system 160) to select content items and social engagement data to incorporate into media content, such as media distributed by a partner system 160. The selection tool 240 receives a query from the user identifying an object, allowing the user to query the content mapping database 230 for content items mapped to the identified object and to view an aggregated representation of the content items mapped to the identified object. Content items mapped to the identified object, information describing social engagement with the identified object, or an aggregated representation of content items mapped to the identified object may be incorporated into the media content by the user.

In one embodiment, the selection tool 240 allows the user to specify a query identifying one or more objects. The selection tool 240 may provide a drop-down list, a menu, or another mechanism for a user to identify one or more objects in the object store 210. Alternatively, the selection tool 240 may provide a text input box for a user to enter a free-form query. The user may also select one or more filters to apply to a query. Example filters include filters for particular types of content items (e.g., photos, videos, or text), for content items posted during a specified period of time (e.g., the last two hours), for content items posted from a specified location (e.g., from the location of an event), for content items posted by a particular author, or for content items published by a particular content source 110. However, numerous other types of filters may be applied to queries using the selection tool 240.

The selection tool 240 queries the content mapping database 230 for one or more objects identified by a user specified query and retrieves content items mapped to the one or more objects identified by the query. In one embodiment, the selection tool 240 returns representations of the content items matching a query as a list ranked according to the scores assigned to the content items by the scoring module 225. In another embodiment, the selection tool 240 allows the user specifying the query, or an entity associated with the user specifying the query (e.g., a partner system 160) to access content items associated with the identified one or more objects (and satisfying filter criteria specified by the query) via an application programming interface, rather than displaying the content items to the user. The user may interact with the selection tool 240 to select particular content items for incorporation into media. The selected content items are communicated to the partner interface 245 for incorporating into media distributed by a partner system 160. Furthermore, as new content items are received from the content sources 110 that are mapped to objects associated with the query, the selection tool 240 may retrieve and provide the newly received content items to the user or to the partner system 160.

In another embodiment, the selection tool 240 provides social engagement analytics associated with one or more objects to a user or to a partner system 160. The selection tool 240 may retrieve social engagement data from the engagement analysis module 235 when a user submits a query for content items associated with an object. For example, in response to receiving a query for an object in the object store, the selection tool 240 retrieves a list of content items mapped to the object and social engagement data associated with the object. Alternatively, the selection tool 240 may enable users to specify queries for content item analytics instead of, or in addition to, specifying queries for content items themselves. For example, a user may specify queries for particular types of social engagement data, such as social engagement with an object at a particular time, social engagement of a particular demographic group with the object, or a comparison between levels of social engagement with two or more objects. Still further, the selection tool 240 may automatically retrieve engagement data and display a representation of the engagement data to a user. For example, the selection tool 240 displays a list of objects having a highest overall social engagement level in a recent time period, such as the last hour.

The selection tool 240 may display a representation of the social engagement data, such as scores representing social engagement data or a visualization of the social engagement data, or send the representation of the social engagement data to the partner system 160 via an API. The user may interact with the selection tool 240 to create visualizations of social engagement with one or more objects and select social engagement data for incorporating into media. The engagement visualizations or selected engagement data are communicated to the partner interface 245 for incorporating into media distributed by a partner system 160.

The partner interface 245 provides an interface between the aggregation system 150 and a partner system 160, enabling the partner system 160 to incorporate content items or social engagement analytics into content distributed by the partner system 160. For example, the partner interface 245 comprises an API compatible with the partner system 160. In one embodiment, the partner interface 245 is customized for different partner systems 160, enabling the aggregation system 150 to provide content to the partner system 160 in a format suitable for integration into media distributed by the partner system 160.

Generating Aggregated Representations of Social Activity

Figure 3:
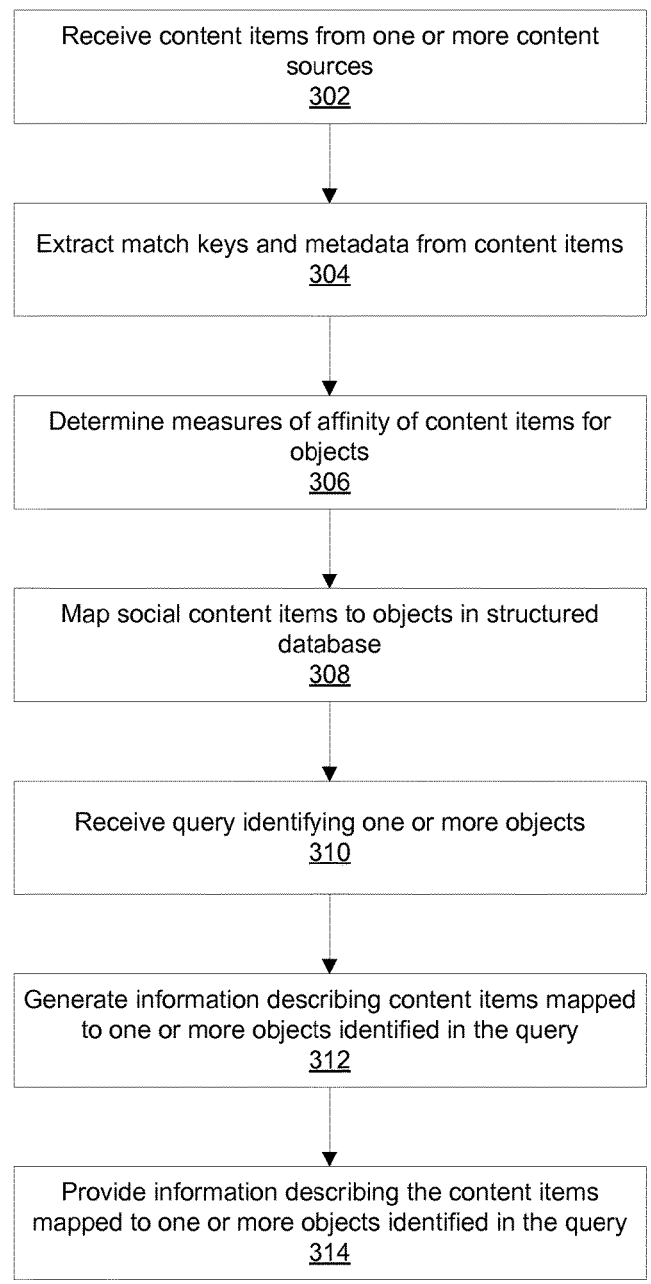
FIG. 3 is a flowchart illustrating a process for integrating social content items into media, according to one embodiment.

FIG. 3 is a flowchart illustrating one embodiment of a process for integrating content items from the content sources 110 into media distributed by a partner system 160. In one embodiment, the steps of the process are performed by the aggregation system 150. Other embodiments of the process include different, fewer, or additional steps, or may perform the steps in different orders.

The aggregation system 150 receives 302 content items from one or more content sources 110, such as social networking systems. In one embodiment, the aggregation system 150 receives 302 feeds that each include one or more content items from one or more content sources 110. The aggregation system 150 extracts 304 match keys and metadata (such as author, location, and time) from each of the received content items. In one embodiment, the match keys and metadata are tokenized into a set of discrete terms or phrases.

The aggregation system 150 uses the match keys and metadata 304 from each content item to determine 306 a measure of affinity between each content item and various objects in the object store 210. In one embodiment, the aggregation system 150 determines 306 a measure of affinity of a content item for various objects by analyzing affinities associated with match keys and metadata extracted 304 from the content item to information associated with various objects. In one embodiment, the aggregation system 150 determines a baseline measure of affinity between the content item and respective objects based on match keys extracted from the content items. For example, the object store 210 stores affinity values between match keys and objects, and the aggregation system 150 determines a baseline measure of affinity between a content item and various objects based on the stored affinity values associated with match keys extracted 304 from the content item. The aggregation system 150 may additionally or alternatively use metadata associated with a content item, such as an author or a content source 110 of the content item, to generate the baseline measure of affinity between the content item and various objects in the object store 210.

In one embodiment, the aggregation system 150 adjusts the baseline measure of affinity of a content item for one or more objects based on other metadata associated with the content item, such as a time when the content item was created or provided to a content source 110 or a location associated with the content item. For example, the aggregation system 150 identifies an event associated with one or more objects (e.g., an athletic event associated with two teams and their respective athletes) and modifies a baseline measure of affinity between a content item and the one or more objects based on metadata associated with the content item and information associated with the event. For example, if the content item was posted during a time window corresponding to the event, the aggregation system 150 increases the baseline measure of affinity between the content item and objects associated with the event; however, if the content item is posted outside of a time window corresponding to the event, the aggregation system 150 may decrease the baseline measures of affinity between content items and objects associated with the event.

Based on the measures of affinity of the received content items to objects in the object store 210, the aggregation system 150 maps 308 the content items to one or more objects. In one embodiment, a content item is mapped 308 to an object if the measure of affinity of the content item for the object has at least a threshold value. In another embodiment, a content item is mapped 308 to an object for which the content item has a maximum measure of affinity. A content item may be mapped 308 to one or more objects in the object store 210. For example, if an object is related to an additional object based on an ontology associated with the objects and a content item is mapped 308 to the object, the aggregation system 150 may also map 308 the content item to the additional object based on the relationship between the object and the additional object.

The aggregation system 150 receives 310 a query identifying one or more objects in the object database 210. As an example, the aggregation system 150 receives 310 a query from a broadcaster identifying an athletic event, such as identifying objects corresponding to teams competing in the athletic event. The query may include one or more filters to filter content items associated with the identified one or more objects by type, by author, by creation time, by location, or by any other suitable factor.

In response to receiving the query, the aggregation system 150 identifies content items mapped to the one or more objects identified by the query and generates 312 information describing the identified content items. For example, the aggregation system 150 generates 312 an aggregated representation of the identified content items. In one embodiment, the aggregation system 150 generates a list of the content items mapped to the one or more objects identified by the query. The list may be sorted by scores assigned to the content items, such as scores representing social engagement of users of one or more content source 110 with each content item in the list. As an example, the aggregation system 150 retrieves photos posted by users to a content source 110 that are mapped to an object identified by the query. The aggregation system 150 aggregates the retrieved photos and ranks the retrieved photos based on a number of times users of a content source 110 form which a photo was received shared the photo or indicated a preference for the photo. The photos are subsequently presented or identified based at least in part on the ranking.

In another embodiment, the aggregation system 150 analyzes properties of the content items mapped to the objects in the query. The aggregation system 150 generates an aggregated representation of the content items by determining measures of social engagement with content items associated with one or more objects identified by the query. For example, the aggregation system 150 determines a number of content items mapped to an object identified by the query, or determines a number of times users of the content sources 110 liked or shared the content items mapped to an object in the query. Based on the measures of social engagement of users with the content items associated with an object identified by the query via one or more content sources 110, the aggregation system 150 evaluates an overall engagement with the object identified by the query. For example, the information describing the identified content items includes a representation of social engagement with one or more objects identified by the query. As another example, the information describing the identified content items provides a representation of social engagement with one or more objects identified by the query in comparison to social engagement with other objects. In various embodiments, the representations of social engagement may include numeric scores, graphs, or other visualizations of social engagement data.

The aggregation system 150 provides 314 the information describing the identified content items to the user providing the query. The user may select content items or measures of social engagement from the information describing the identified content items for inclusion into media, such as a broadcast. For example, if a broadcaster providing a broadcast of an athletic event specified a query for teams competing in the event, the aggregation system 150 generates information describing content items from one or more content sources 110 mapped to the teams identified by the query (e.g., fan commentary and photos from event attendees) and displays the information to the broadcaster. The broadcaster may select comments and photos from the displayed information to include in the broadcast. As another example, the aggregation system 150 generates and displays a representation of social engagement with the teams competing in the event, such as a heat map identifying levels of social engagement with the teams by users at various locations. In one embodiment, the aggregation system 150 is configured to interface with a partner system 160 providing the broadcast to integrate content items or measures of social engagement into the broadcast.

In one embodiment, the aggregation system 150 periodically updates the information describing the content items mapped to objects identified by a query. As new content items are received from the content sources 110 and mapped to objects identified by the query, the aggregation system 150 may update the information describing the identified content items mapped to one or more objects identified by the query and provide the updated information to the user providing the query. Alternatively, the aggregation system 150 updates the information describing the content items mapped to objects identified by the query when the aggregation system 150 receives an instruction from the user providing the query to update the information.

As an example application of the process shown in FIG. 3, the aggregation system 150 retrieves a set of photos and social network posts uploaded to content sources 110 by attendees of a concert identified by a query provided by a user. The user selects photos and posts from the set to display on a jumbotron in the venue hosting the concert, and the aggregation system 150 provides the selected items to a computer system operating the jumbotron. As another example, viewers of a broadcast provide responses to a question posed during the broadcast via the content sources 110. The aggregation system 150 retrieves the responses and provides information describing responses to the broadcast system for incorporation into the broadcast when a query identifying the broadcast is received by the aggregation system 150. In a further example, the aggregation system 150 provides an online sports portal with data describing engagement of users with various teams or athletes identified in a query. The online portal uses the engagement data to generate visualizations of teams or athletes being discussed frequently at a given time.

Although embodiments of the aggregation system 150 have been described herein with respect to a sports ontology, the aggregation system 150 may aggregate content items related to any of a variety of topics. For example, ontologies may be defined for current events, television shows, musicians and concerts, political campaigns, or any of a wide variety of other domains. The aggregation system 150 matches content items to objects in these ontologies to generate information describing content items associated with the objects in these ontologies using methods similar to those described above.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving content items from one or more content sources;
   determining measures of affinity of the received content items for one or more objects included in a database maintained by an online system;
   mapping the content items to one or more of the objects based at least in part on the determined measures of affinity;
   receiving a query from a requesting entity for content items to display in a broadcast media video stream, the query identifying an object from the database and requesting information associated with the identified object;
   identifying one or more content items mapped to the object identified by the query;
   for each content item of the identified content items:
     identifying a set of actions, the set of actions including a plurality of action types, performed on the content item by one or more entities other than the requesting entity;
     determining a measure of social engagement for the content item based on the identified set of actions taken by the one or more entities other than the requesting entity and based on a number of the identified one or more content items mapped to the object identified by the query;

ranking the identified content items based on the determined measures of social engagement associated with the content items;

providing information describing the ranking of the identified content items mapped to the object identified by the query to the requesting entity;

receiving a selection of one or more of the ranked content items from the requesting entity; and modifying the broadcast media video stream to include a display of the selected content items within a broadcast media video stream interface.

2. The method of claim 1, wherein mapping the content items to objects in the database comprises:

extracting one or more terms from each of the received content items;

determining the measures of affinity between one or more terms extracted from each of the received content items and the one or more objects in the database based at least in part on a comparison of the one or more terms extracted from a received content item and match keys associated with one or more objects, a match key associated with an object comprising one or more terms identifying the object; and mapping the received content items to the one or more objects based at least in part on the determined measures of affinity.

3. The method of claim 1, wherein a content item is mapped to an object if the measure of affinity between the content item and the object is greater than a threshold measure of affinity.

4. The method of claim 1, wherein the information describing the ranking of the identified content items mapped to the object identified by the query comprises a ranked list of the content items mapped to the object identified by the query.

5. The method of claim 1, wherein providing information describing the ranking of the identified content items mapped to the object identified by the query to the requesting entity comprises providing the determined measures of social engagement associated with the identified content items to the requesting entity.

6. The method of claim 5, wherein the measures of social engagement include a comparison between social engagement with the object identified by the query and social engagement with another object in the database of the online system.

7. A method comprising:

specifying a query to an online system, the query identifying an object;

receiving information describing one or more content items mapped to the object by the online system based at least in part on measures of affinity between each of the one or more content items and the object, the received information comprising a ranked list of content items ranks based on measures of social engagement, the measures of social engagement determined based on actions taken within the online system by one or more other entities on the content items and based on a number of one or more types of interactions with the one or more content items mapped to the object;

selecting a set of the received information;

including the selected set of the received information in media content for display within a media video stream being broadcasted; and modifying the broadcasted media video stream to include the media content with the selected set of the received information.

8. The method of claim 7, wherein the query further includes one or more filters specifying criteria of content items.

9. The method of claim 8, wherein the received information describing the one or more content items mapped to the object by the online system includes one or more content items mapped to the object by the online system and satisfying criteria specified by the one or more filters.

10. A computer program product comprising a non-transitory computer readable storage medium having instructions encoded thereon that, when executed by a processor, cause the processor to:

receive content items from one or more content sources;

determine measures of affinity of the received content items for one or more objects included in a database maintained by an online system;

map the content items to one or more of the objects based at least in part on the determined measures of affinity;

receive a query from a requesting entity for content items to display in a broadcast media video stream, the query identifying an object from the database and requesting information associated with the identified object;

identify one or more content items mapped to the object identified by the query;

for each content item of the identified content items:

identify a set of actions, the set of actions including a plurality of action types, performed on the content item by one or more entities other than the requesting entity;

determine a measure of social engagement for the content item based on the identified set of actions taken by the one or more entities other than the requesting entity and based on a number of the identified one or more content items mapped to the object identified by the query;

rank the identified content items based on the determined measures of social engagement associated with the content items;

provide information describing the ranking of the identified content items mapped to the object identified by the query to the requesting entity;

receive a selection of one or more of the ranked content items from the requesting entity; and modify the broadcast media video stream to include a display of the selected content items within a broadcast media video stream interface.

11. The computer program product of claim 10, wherein the instructions causing the processor to map the content items to one or more of the objects based at least in part on the determined measures of affinity comprise instructions, that when executed by the processor, cause the processor to:

extract one or terms from each of the received content items;

determine the measures of affinity between one or more terms extracted from each of the received content items and the one or more objects in the database based at least in part on a comparison of the one or more terms extracted from a received content item and match keys associated with one or more objects, a match key associated with an object comprising one or more terms identifying the object; and map the received content items to the one or more objects based at least in part on the determined measures of affinity.

12. The computer program product of claim 10, wherein a content item is mapped to an object if the measure of affinity between the content item and the object is greater than a threshold measure of affinity.

13. The computer program product of claim 10, wherein the instructions causing the processor to provide information describing the ranking of the identified content items mapped to the object identified by the query to the requesting entity comprise instructions that, when executed by the processor, cause the processor to provide the determined measures of social engagement associated with the identified content items to the requesting entity.

14. The computer program product of claim 10, wherein the instructions causing the processor to determine measures of social engagement further comprise instructions that, when executed by the processor, cause the processor to determine a number of one or more types of interactions with the identified one or more content items mapped to the object identified by the query.

* * * * *